US012078330B1

(12) United States Patent
Zhang et al.

(10) Patent No.: US 12,078,330 B1
(45) Date of Patent: Sep. 3, 2024

(54) LIGHTING APPARATUS

(71) Applicant: LEEDARSON LIGHTING CO., LTD., Fujian (CN)

(72) Inventors: Huitang Zhang, Fujian (CN); Jinfu Chen, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 18/407,140

(22) Filed: Jan. 8, 2024

(30) Foreign Application Priority Data

Feb. 21, 2023 (CN) ......................... 202320274832.7

(51) Int. Cl.

| | |
|---|---|
| ***F21V 21/30*** | (2006.01) |
| ***F21V 17/16*** | (2006.01) |
| ***F21V 21/096*** | (2006.01) |
| ***F21V 21/34*** | (2006.01) |
| ***F21W 131/30*** | (2006.01) |

(52) U.S. Cl.

CPC ............ *F21V 21/30* (2013.01); *F21V 17/162* (2013.01); *F21V 21/096* (2013.01); *F21V 21/34* (2013.01); *F21W 2131/30* (2013.01)

(58) Field of Classification Search

CPC ....... F21V 17/16–18; F21V 21/096–13; F21V 21/34; F21W 2131/30

See application file for complete search history.

(56) References Cited

U.S. PATENT DOCUMENTS 9,903,571 B2 * 2/2018 Schubert ................. F21V 21/13

* cited by examiner

*Primary Examiner* — Jason M Han

(74) *Attorney, Agent, or Firm* — Chun-Ming Shih; LANWAY IPR SERVICES

(57) ABSTRACT

A lighting apparatus includes a light source, a light housing, a sliding track, a first sliding unit, a first holder, a second sliding unit, a second holder, a first fixing unit and a second fixing unit. The light housing has a back cover and container. The container has a light opening. The light source is placed in the container and emits a light through the light opening. The sliding track is disposed on the back cover. The first sliding unit is movable along the sliding track. The first holder has a bottom end fixed to the first sliding unit. The second sliding unit is movable along the sliding track. The second holder has a bottom end fixed to the second sliding unit. The first fixing unit is fixed to the first holder. The second fixing unit is fixed to the second holder.

20 Claims, 13 Drawing Sheets

LIGHTING APPARATUS

FIELD

The present invention is related to a lighting apparatus, and more particularly related to a lighting apparatus with a flexible bracket structure.

BACKGROUND

Light devices play an integral role in our modern lives, shaping the way we interact with our surroundings. From the moment we wake up to the time we go to bed, we are surrounded by various forms of lighting, making our daily activities possible and more comfortable.

Among the many technologies that have revolutionized lighting, LED (Light Emitting Diode) technology stands out as a critical innovation. LEDs have not only improved the quality of light but have also significantly enhanced energy-saving capabilities. This makes LEDs a popular choice for both residential and commercial lighting solutions.

The advantages of LED lighting extend beyond energy efficiency. LEDs are known for their durability and long lifespan, reducing the need for frequent replacements. They are also highly versatile and can be used in various lighting applications, including indoor and outdoor settings.

LED technologies quickly apply to various common types of lighting devices.

Downlights, for instance, have become a staple in residential lighting. These recessed lights are often found in homes, offices, and commercial spaces, providing focused and efficient illumination. They offer both ambient and task lighting, creating a comfortable environment.

Panel lights, on the other hand, are prevalent in office environments. LED panel lights are commonly used in classrooms and workplaces, offering a uniform and glare-free source of light. They help reduce eye strain and improve productivity, thanks to their even and bright illumination.

In homes and businesses, LED light bulbs have replaced traditional incandescent bulbs due to their energy efficiency and longer life. These versatile bulbs come in various shapes and sizes, making it easy for consumers to switch to LED lighting without altering their existing fixtures.

Spotlights find applications in both residential and commercial spaces. In homes, they can be used to accentuate artwork or highlight architectural details. In commercial settings, they are employed for theatrical and display lighting, drawing attention to specific products or performances.

Beyond indoor applications, LED technology has also transformed outdoor lighting. LED streetlights are now commonly used in cities, providing energy-efficient and reliable illumination for streets and public spaces. LED floodlights are used for security and outdoor event lighting, offering bright and efficient coverage.

In conclusion, LED technology has had a profound impact on the lighting industry, contributing to energy savings, durability, and versatility in various light devices. From downlights and panel lights to light bulbs and spotlights, LEDs have become the go-to choice for both residential and commercial lighting, enhancing our daily lives while conserving energy resources.

The importance of proper light device installation is crucial, especially in countries where labor costs are relatively high. Many regions mandate that only licensed professionals handle light device installations to ensure compliance with safety regulations and industry standards.

Difficult installations can lead to a significant increase in costs, sometimes even surpassing the price of the light devices themselves. Complex installation procedures require more labor hours, result in higher wage expenses, and may demand additional materials, contributing substantially to the overall project expenses.

Moreover, the lighting industry faces challenges due to the diverse range of installation environments and settings. For instance, certain places have standardized ceiling hole sizes of 30 cm square, while others might require 26 or 36 cm square dimensions. Designing light devices that can adapt to these varying specifications introduces complexities and cost implications.

Therefore, there is a compelling argument for the development of more flexible light devices capable of accommodating different situations and requirements. Such adaptability not only simplifies the installation process but also enhances overall cost-effectiveness and efficiency, delivering benefits to consumers and businesses alike. These versatile devices could be adjusted to fit various environments with minimal modifications.

In many countries, the expense of labor is a significant factor in the installation process. Consequently, ensuring that installations are done correctly becomes a priority. This often leads to the requirement of licensed professionals to carry out light device installations, guaranteeing safety and compliance with stringent regulations.

The challenges associated with challenging installations extend to increased project costs. Complex installation procedures result in extended work hours, higher labor costs, and sometimes the need for additional materials. This can make the total cost of a lighting project considerably higher than expected.

Furthermore, the diversity of installation environments and settings presents logistical and cost-related challenges. The variation in ceiling hole sizes, for example, can complicate the manufacturing process. Adapting light devices to fit different requirements incurs additional expenses.

In light of these challenges, there is a strong incentive to develop more flexible light devices that can adapt to different situations and specifications. Such adaptable devices would not only simplify installation but also reduce overall costs, benefiting consumers and businesses in various settings.

In summary, emphasizing the significance of proper light device installation is essential, especially in regions where labor costs are a significant consideration. Difficult installations can escalate expenses, making them even higher than the cost of the light devices themselves. Additionally, the diversity of installation environments and specifications requires innovative solutions. Developing more flexible light devices capable of adapting to different situations and requirements could offer significant cost-saving advantages and enhance efficiency in the lighting industry.

SUMMARY

In some embodiments, a lighting apparatus includes a light source, a light housing, a sliding track, a first sliding unit, a first holder, a second sliding unit, a second holder, a first fixing unit and a second fixing unit.

The light housing has a back cover and container.

The container has a light opening.

The light source is placed in the container and emits a light through the light opening.

The sliding track is disposed on the back cover.

The first sliding unit is movable along the sliding track.

The first holder has a bottom end fixed to the first sliding unit.

The second sliding unit is movable along the sliding track.

The second holder has a bottom end fixed to the second sliding unit.

The first fixing unit is fixed to the first holder.

The second fixing unit is fixed to the second holder.

A relative width between the first holder and the second holder is adjustable by moving the first sliding unit and the second sliding unit for changing a spanning diameter of the first fixing unit and the second fixing unit to adapt to different installation platforms with different installation diameters.

In some embodiments, the sliding track has a top plate, a lateral wall and a bottom plate.

The top plate has a slit opening.

In some embodiments, the sliding unit has a top part, a middle part and a bottom part.

The top part is parallel to the bottom part.

The middle part connects the top part and the bottom part.

The top part is above the top plate of the sliding track.

The bottom part is blow the top plate.

In some embodiments, the bottom plate is a portion of the back cover.

In some embodiments, the sliding track is a separate component fixed to the back cover with a fastener.

In some embodiments, there are multiple alignment structures.

When the sliding unit is placed at one of the multiple alignment structure, unless an external force over a threshold is applied, the sliding unit stays at the alignment structure.

In some embodiments, the alignment structure is a groove.

The multiple alignment structures correspond to multiple installation platforms.

In some embodiments, the sliding unit has an elastic component for generating an elastic force for keeping the sliding unit staying at the groove unless an external force larger than the threshold to move the sliding unit.

In some embodiments, the first fixing unit and the second fixing unit are respectively fixed to the first holder and the second holder with a first connector and a second connector.

The first connector and the second connector are unlocked to replace to another type of the first fixing unit and the second fixing unit.

In some embodiments, the first fixing unit and the second unit comprise two torsion springs.

In some embodiments, the first fixing unit and the second unit comprise to foldable elastic plates.

In some embodiments, the back cover is circular plate.

There is a circular rib disposed on the circular plate.

In some embodiments, the sliding track has a protrusion structure together with the circular rib to enhance the structural length.

In some embodiments, the a height of the diameter is smaller than 20% of a diameter of the circular plate.

In some embodiments, the sliding track has a electrical power socket for guiding an electrical power to the light source.

In some embodiments, a power bracket for mounting a driver container to keep the driver container fixed at a same position.

The driver container includes a driver circuit for generating a driving current to the light source.

In some embodiments, the sliding track is a separate component detachably attached to the back cover with a back connector.

In some embodiments, the first holder is rotatable on the sliding track to change a relative position to the second holder.

In some embodiments, the sliding track has a driver container.

The driver container contains a driver circuit for generating a driving current to the light source.

In some embodiments, the sliding track is attached to the back cover with a magnetic component.

DETAILED DESCRIPTION

Figure 8:
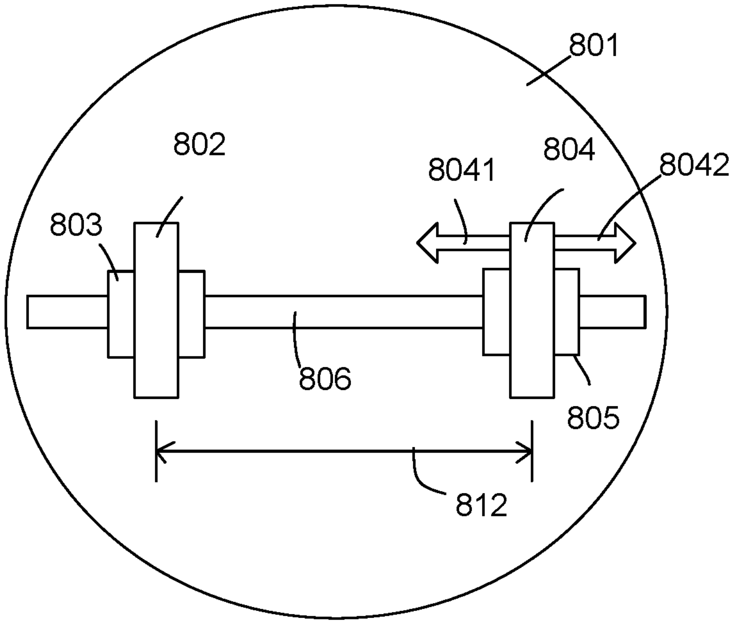
FIG. 8 illustrates another lighting apparatus embodiment.
Figure 9:
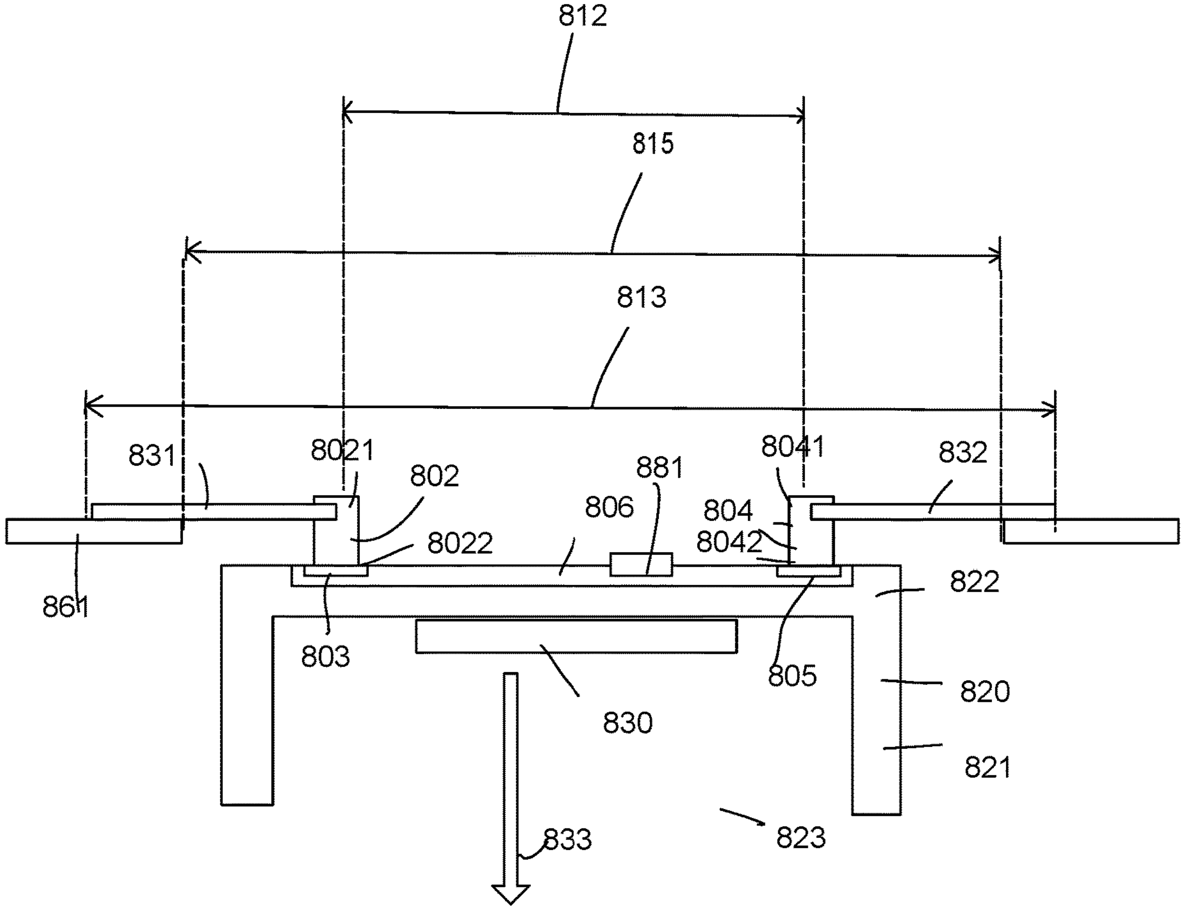
FIG. 9 illustrates a side view of the example of FIG. 8.

Please refer to FIG. 8 and FIG. 9, which show a lighting apparatus embodiment. FIG. 8 shows a top view and the FIG. 9 shows a side view of the components for the lighting apparatus.

In FIG. 8 and FIG. 9, the lighting apparatus includes a light source 830, a light housing 820, a sliding track 806, a first sliding unit 803, a first holder 802, a second sliding unit 805, a second holder 804, a first fixing unit 831 and a second fixing unit 832.

The light housing 820 has a back cover 822 and container 821.

The container 821 has a light opening 823.

The light source 830 is placed in the container 821 and emits a light through the light opening 833.

The sliding track 806 is disposed on the back cover 822.

The first sliding unit 803 is movable along the sliding track 806.

The first holder 802 has a bottom end 8022 fixed to the first sliding unit 803.

The second sliding unit 805 is movable along the sliding track 806.

The second holder 804 has a bottom end 8042 fixed to the second sliding unit 805.

The first fixing unit 831 is fixed to the first holder 802.

The second fixing unit 832 is fixed to the second holder 804.

A relative width 812 between the first holder 802 and the second holder 804 is adjustable by moving the first sliding unit 803 and the second sliding unit 805 for changing a spanning diameter 813 of the first fixing unit 831 and the second fixing unit 832 to adapt to different installation platforms 861 with different installation diameters 815.

In the example, the first fixing unit 831 is rotatable with respect to the first holder 802 while applying an external force, e.g. users may pull the light housing 802 downwardly.

When the first fixing unit 831 and the second fixing unit 832 are rotated with respect to the first holder 802 and the second holder 804, the spanning diameter 813 is decreased so as to be adjusted smaller than the installation diameter 815 of the installation platform 861, like an installation hole on a ceiling. When this occurs, the lighting apparatus may pass through the hole of the installation platform 861 to escape from the installation platform 861.

The lighting apparatus may be installed to the installation platform 861 in similar way. While no external force is applied, the first fixing unit 831 and the second fixing unit 832 keeps a spanning diameter 813 that is larger than the installation diameter 815 and thus the lighting apparatus is kept in the installation platform 861.

The first sliding unit 803 and the second sliding unit 805 are movable along the sliding track 806 so that the relative width 812 between the first holder 802 and the second holder 804 is adjusted and consequently adjusts the spanning diameter 813 between the first fixing unit 831 and the second fixing unit 832.

The lighting apparatus may be a panel light, a spot light, a downlight, or other lighting apparatus. The light housing 820 is therefore adjusted to fit different shapes for downlight devices, panel light devices, spot light devices, light tubes, light bulbs or other light devices.

Figure 10A:
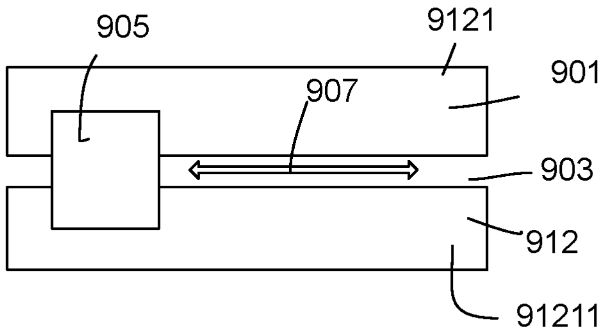
FIG. 10A illustrates a sliding unit example.
Figure 10B:
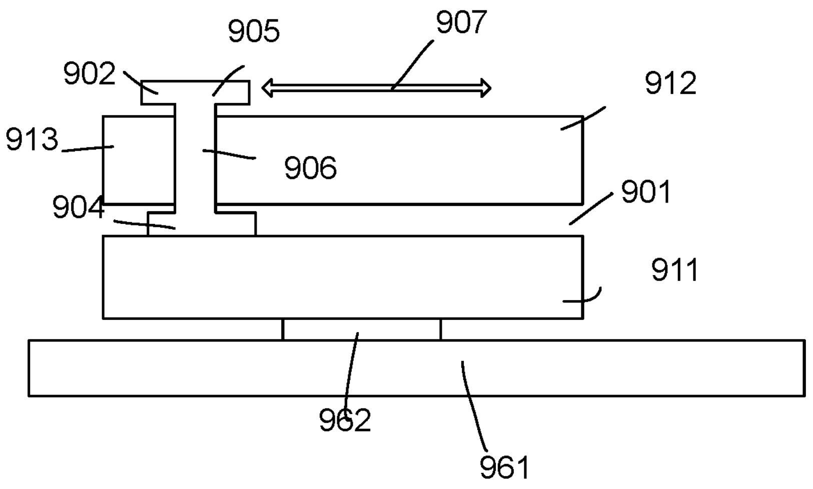
FIG. 10B shows another view of the example in FIG. 10A.

Please refer to FIG. 10A and FIG. 10B, which illustrate an example of two components mentioned above.

FIG. 10A shows a top view and the FIG. 10B show a side view of the example.

In FIG. 10A and FIG. 10B, the sliding track 901 has a top plate 912, a lateral wall 913 and a bottom plate 911. Please note that the side view of FIG. 10B shows a cross-sectional view so as to expose the sliding unit 905. There is a lateral wall 913 connecting the top plate 912 and the bottom plate 911 in this example.

The top plate 901 has a slit opening 903.

In some embodiments, the sliding unit 905 has a top part 902, a middle part 906 and a bottom part 904.

The top part 902 is parallel to the bottom part 904.

The middle part 906 connects the top part 902 and the bottom part 904.

The top part 902 is above the top plate 912 of the sliding track 901.

The bottom part 904 is blow the top plate 912.

In FIG. 10A and FIG. 10B, the sliding unit 905 is movable along the direction 907 of the track 901.

In some embodiments, the bottom plate is a portion of the back cover.

In some embodiments, the sliding track is a separate component fixed to the back cover with a fastener, e.g. a hook structure or a screw.

Figure 11:
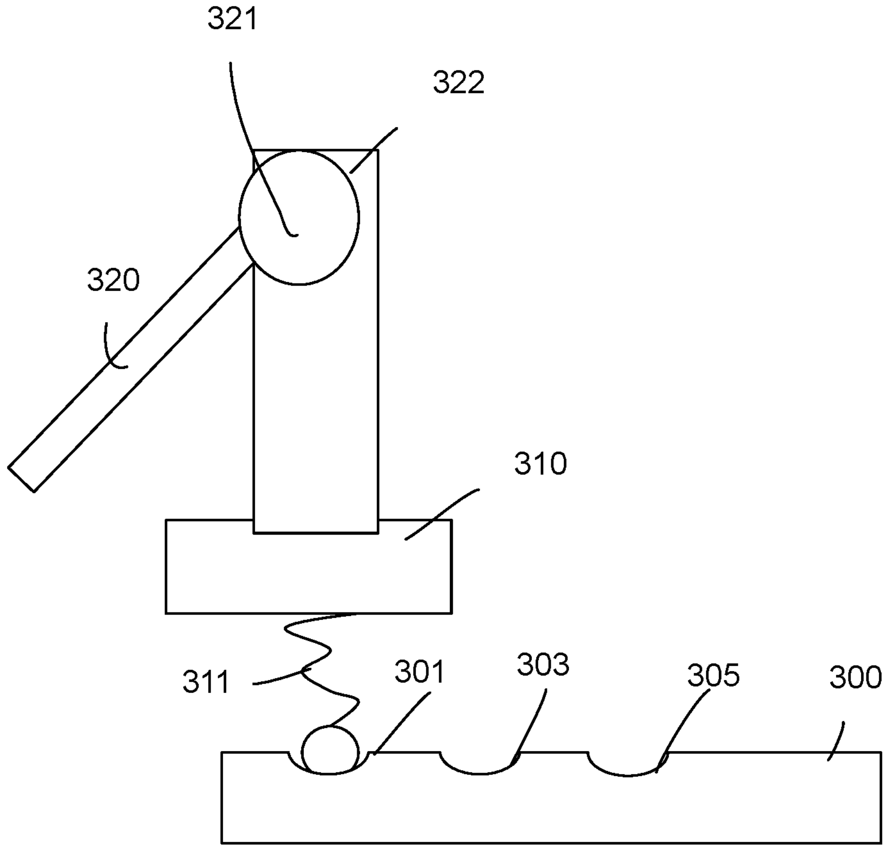
FIG. 11 shows a sliding unit example.

In FIG. 11, there are multiple alignment structures 301, 303, 305 disposed on the sliding track 300.

When the sliding unit 310 is placed at one of the multiple alignment structure, unless an external force over a threshold is applied, the sliding unit stays at the alignment structure.

In some embodiments, the alignment structure is a groove, or a concave structure or other structures that may trap the sliding unit unless a sufficient external force to move it.

The multiple alignment structures correspond to multiple installation platforms.

In some embodiments, the sliding unit has an elastic component 311 for generating an elastic force for keeping the sliding unit staying at the groove unless an external force larger than the threshold to move the sliding unit.

In some embodiments, the first fixing unit and the second fixing unit are respectively fixed to the first holder and the second holder with a first connector and a second connector.

Figure 3:
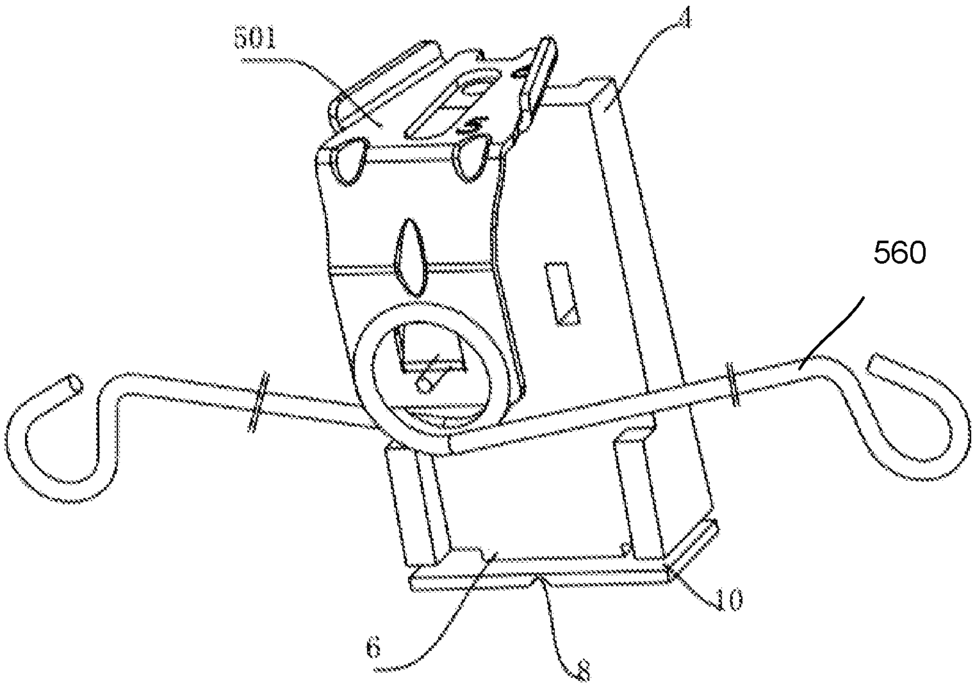
FIG. 3 illustrates a fixing unit and a holder example.

FIG. 3 shows an example of a fixing unit 560 and a holder 4. There is a connector 501 that is a metal bent clip fixed on top of the holder 4. With such design, the fixing unit 560 is easily attach to the holder 4. To fit to different types of installation platforms, the fixing unit 560 may be detached from the connector 501 to be replaced with another type of fixing unit.

The fixing unit, the connector and the holder in FIG. 3 may be applied to the first holder, the second holder, the first connector, the second connector, the first fixing unit and the second fixing unit.

The first connector and the second connector are unlocked to replace to another type of the first fixing unit and the second fixing unit.

In some embodiments, the first fixing unit and the second unit comprise two torsion springs. The fixing unit 560 shows an example of torsion spring that is made by a metal string bent to form a spring that may be deformed elastically by applying an external force.

In some embodiments, the first fixing unit and the second unit comprise to foldable elastic plates.

FIG. 11 shows an example of such foldable elastic plate that has a spring part 321 that provides the lever 320 to rotate with respect to the holder 322 if an external force is applied. When the external force is removed, the spring part 321 uses its elastic force to move back the lever 320 to its original position.

In some embodiments, the back cover is circular plate.

There is a circular rib disposed on the circular plate.

Figure 7A:
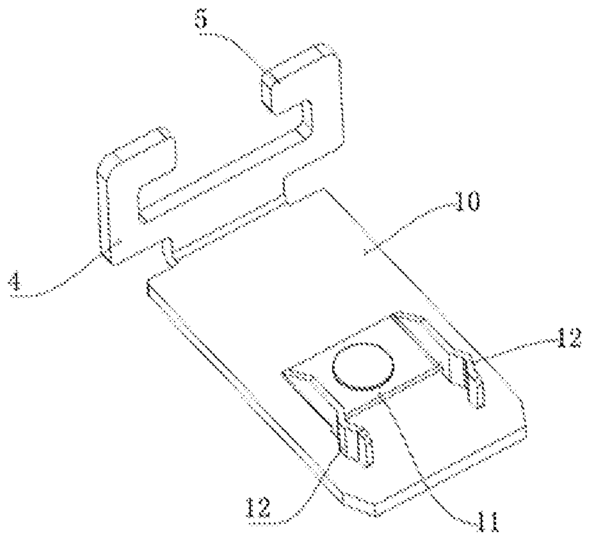
FIG. 7A illustrates a sliding unit example.
Figure 7B:
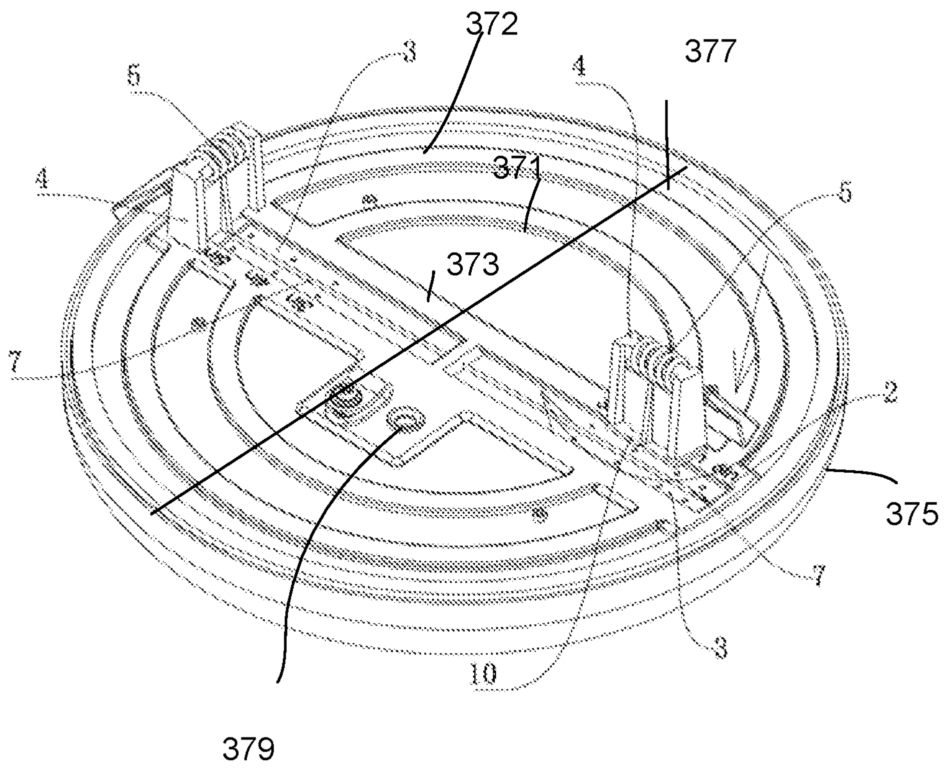
FIG. 7B illustrates another lighting apparatus example.

FIG. 7B shows such an example. In FIG. 7B, the circular back cover has multiple circular ribs 371, 372.

In some embodiments, the sliding track has a protrusion structure 373 together with the circular ribs 371, 372 to enhance the structural length. When the back cover is large, e.g. more than 20 cm, such structure ensures the structure strength of the overall light device. In other words, the sliding track not only provides a flexible assembly, but also enhances the overall structure strength.

In some embodiments, the a height 375 of the diameter is smaller than 20% of a diameter 377 of the circular plate.

In FIG. 7B, the sliding track has an electrical power socket 379 for guiding an electrical power to the light source.

Figure 12:
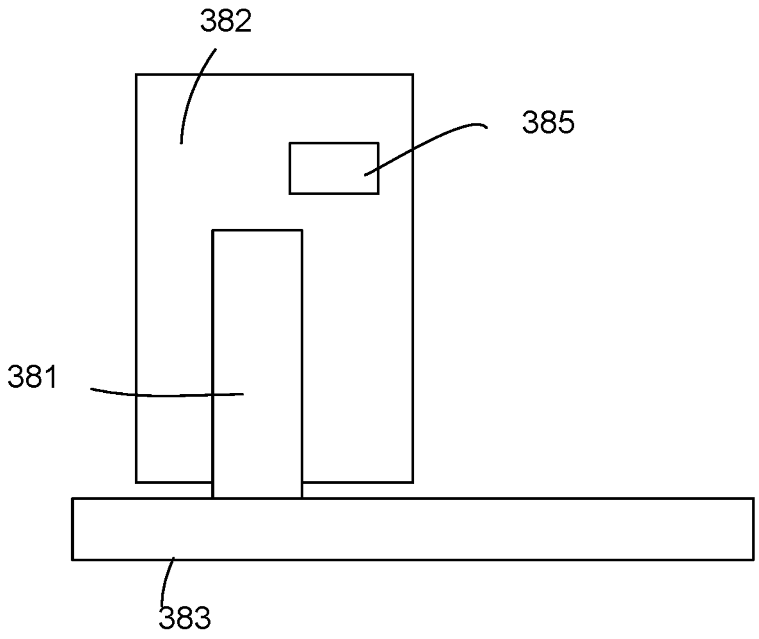
FIG. 12 shows a bracket for holding a driver container.

In FIG. 12, a power bracket 381 that has a protruding connector for mounting a driver container 382 to keep the driver container 382 fixed at a same position.

The driver container 382 includes a driver circuit for generating a driving current 385 to the light source.

In some embodiments, the sliding track is a separate component detachably attached to the back cover with a back connector.

In some embodiments, the first holder is rotatable on the sliding track to change a relative position to the second holder.

In FIG. 9, the sliding track has a driver container 881.

The driver container 881 contains a driver circuit for generating a driving current to the light source.

In FIG. 10B, the sliding track 901 is attached to the back cover 962 with a magnetic component 962.

Please refer to FIG. 1 to FIG. 6, FIG. 7A and FIG. 7B for an explanation of the lighting fixture provided in this utility model. The lighting fixture comprises a main housing 1, sliding components 4, and sliding pieces 10. Inside the main housing 1, there is an illumination unit. At the top of the main housing 1, there is a positioning groove 2 that runs along the side walls of the main housing 1. Inside the main housing 1, there is also a supporting base 3 that matches the position of the positioning groove 2. The supporting base 3 is spaced apart from the side walls of the main housing 1. The first end of the sliding component 4 is located within the positioning groove 2, and the second end extends away from the main housing 1. The second end of the sliding component 4 is equipped with a fixing component for securing the light fixture. The sliding piece 10 is slidably positioned between the supporting base 3 and the side walls of the main housing 1, and it is parallel to the supporting base 3. The first end of the sliding component 4 abuts against the side of the sliding piece 10. There are two sliding components 4 and two sliding pieces 10 in total.

In this embodiment, the lighting fixture provided differs from the prior art by having a positioning groove 1 at the top of the fixture's main housing, with this groove running along the side walls of the main housing. Inside the main housing, there is also a supporting base 3 that matches the position of the positioning groove 1, and the supporting base 3 is spaced apart from the side walls of the main housing. The first end of the sliding component 4 is slidably positioned within the positioning groove 1 through the sliding piece 10. The second end of the sliding component 4 is equipped with a fixing component. The sliding piece 10 is slidably positioned between the supporting base 3 and the side walls of the main housing, and it is parallel to the supporting base 3. In the lighting fixture of this utility model, during fixture installation, the distance between the two sliding components 4 can be adjusted based on the size of the installation hole on the ceiling. This adjustment allows the sliding components 4 to conveniently extend into the installation hole, and then the fixture can be secured using the fixing component. This simplifies and expedites the installation of the fixture, addressing issues related to mismatched fixing structures and installation hole sizes.

It should be noted that inside the main housing 1, there is an illumination unit and a circuit structure that cooperates with the illumination unit. The driver power box can be separately configured and connected to the internal circuit of the main housing 1 through wires. The illumination unit can be configured for side-emitting or down-emitting light or a combination of both. The bottom and/or sides of the main housing 1 may have translucent areas, allowing the light from the illumination unit to pass through the main housing 1 for illumination. Furthermore, the top and bottom of the main housing 1 refer to their positional relationship after the fixture is installed.

In addition, the positioning groove 1 is generally set along the centerline of the top surface of the main housing 1 to ensure balance after fixture installation. When the main housing 1 is circular, the positioning groove 1 is set radially along the main housing 1. The supporting base 3 is typically fixed to the inner wall of the main housing 1 through connecting parts. The positioning groove 1 can be a continuous groove or divided into two parts.

Figure 2:
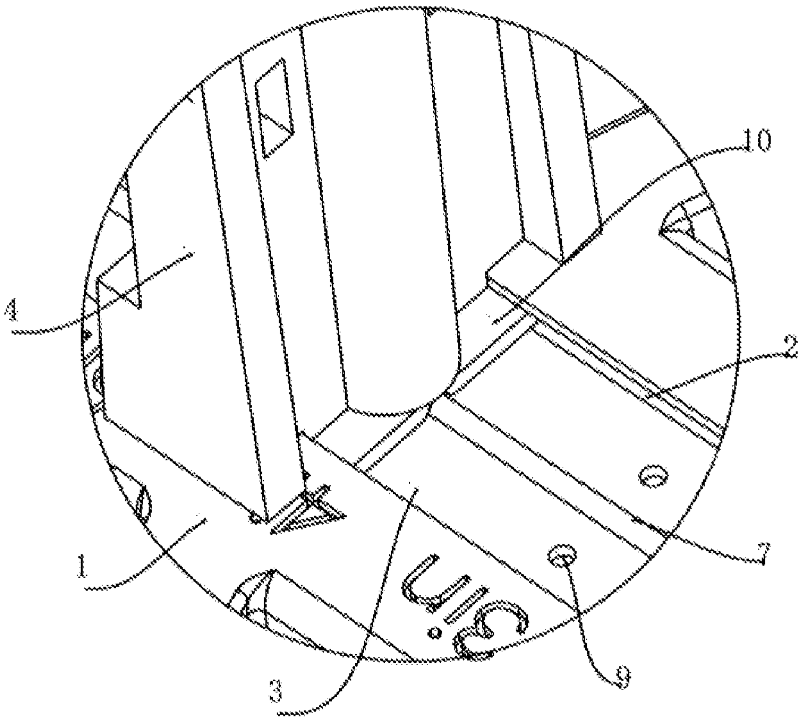
FIG. 2 illustrates a zoom-up view of an area of the embodiment in FIG. 1.

In some possible implementations, as shown in FIGS. 2 and 3, a connecting block 6 is also positioned between the first end of the sliding component 4 and the sliding piece 10. The thickness of the connecting block 6 matches the wall thickness of the main housing 1, and the first end of the sliding component 4 slides against the outer side of the main housing 1. Specifically, the width and length of the connecting block 6 are smaller than the width dimensions of the positioning groove 1. By positioning the connecting block 6 in this way, the size of the sliding component 4 can be larger than the width dimensions of the positioning groove 1. After the sliding piece 10 is secured in the gap between the supporting base 3 and the side wall of the main housing 1, the end of the sliding component 4 can abut against the outer side of the main housing 1, ensuring a more secure and reliable sliding installation of the sliding component 4 in the positioning groove 1, thereby making the entire fixture installation more secure and reliable.

Building upon the features of the sliding component 4 mentioned above, as shown in FIGS. 2 and 7, the length of the sliding piece 10 is greater than the width dimensions of the positioning groove 1, and the width of the sliding piece 10 is smaller than the width dimensions of the positioning groove 1. Specifically, with these dimensions, when the sliding piece 10 is installed with the sliding component 4, the length direction of the sliding piece 10 can be parallel to the length direction of the positioning groove 1. Then, by rotating the sliding component 4 and the sliding piece 10, the length direction of the sliding piece 10 can be rotated to a position perpendicular to the length direction of the positioning groove 1. This allows the sliding piece 10 to be secured in the gap between the supporting base 3 and the side wall of the main housing 1, making it more convenient for the sliding component 4 to be installed in the positioning groove 1 (as indicated by the arrow in FIG. 7). Similarly, when it is necessary to remove the sliding component 4, it is only necessary to reverse the rotation of the sliding piece 10 and the sliding component 4 so that the length direction of the sliding piece 10 is parallel to the length direction of the positioning groove 1, allowing the sliding piece 10 to be removed from the positioning groove 1, achieving the disassembly of the sliding component 4.

To prevent rotation during the sliding of the sliding component 4, as shown in FIGS. 2 and 3, there are guiding protrusions 7 protruding from the supporting base 3. The guiding protrusions 7 are set along the length direction of the positioning groove 1, and the sliding piece 10, near the side of the supporting base 3, is also equipped with accommodating recesses 8 that cooperate with the guiding protrusions 7. Specifically, after the sliding piece 10 and the sliding component 4 are installed in the positioning groove 1, the guiding protrusions 7 are secured inside the accommodating recesses 8, and the setting of the guiding protrusions 7 prevents rotation of the sliding piece 10 during the sliding of the sliding component 4. This ensures greater stability during the installation and sliding of the sliding component 4. The guiding protrusions 7 are generally formed integrally with the supporting base 3, which is typically attached to the bottom surface of the main housing 1. The supporting base 3 is typically made of metal, and during the machining process of the main housing 1, the guiding protrusions 7 can also be simultaneously formed.

Furthermore, as a preferred option, as shown in FIG. 2, there are positioning protrusions on the side of the sliding piece 10 near the supporting base 3. On the side of the supporting base 3, there are multiple positioning grooves 9, and multiple positioning grooves 9 are arranged in succession along the length direction of the positioning groove 1. Typically, two positioning grooves 9 are set as one group, positioned on either side of the guiding protrusions 7, and the location of the positioning protrusions matches the positioning grooves 9. Specifically, the distance between two groups of positioning protrusions can be determined based on conventional installation hole dimensions, facilitating the adjustment of the distance between the two sliding components 4 based on the size of the installation hole, making fixture installation more convenient. Additionally, the positions of the positioning grooves 9 and the positioning protrusions can be interchanged as needed, and this is not further elaborated here.

Figure 1:
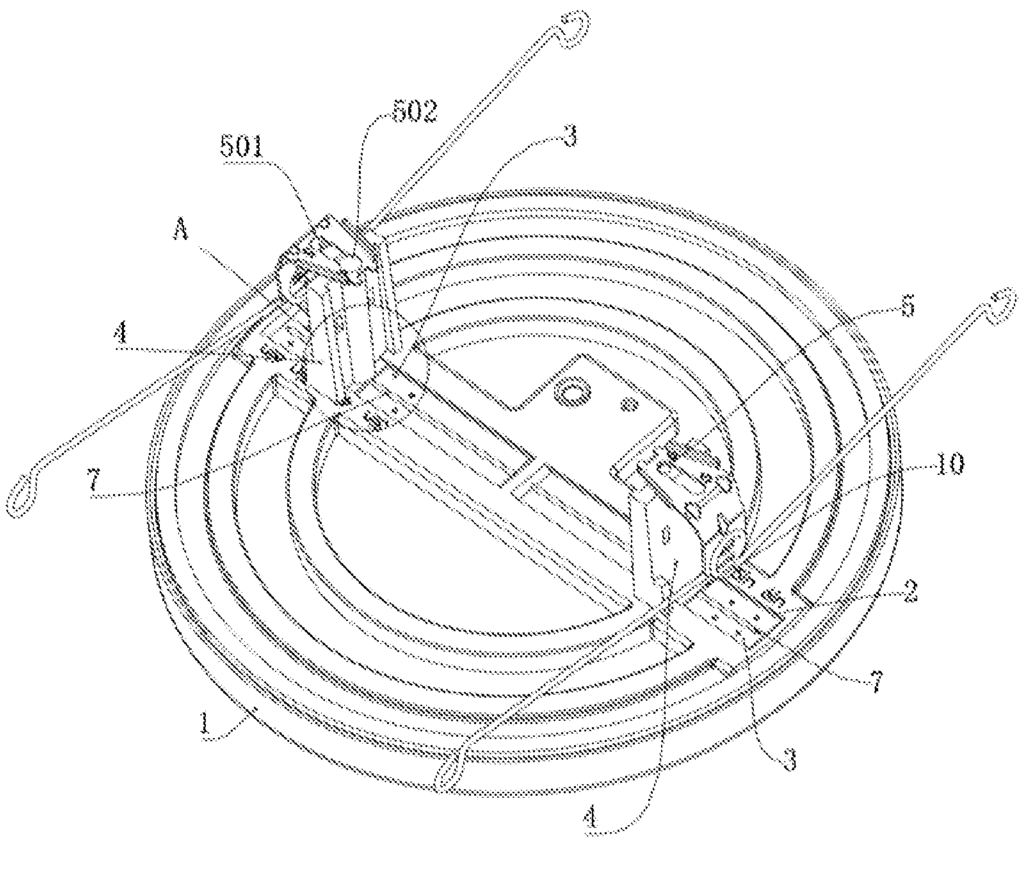
FIG. 1 illustrates a lighting apparatus embodiment.

In some possible implementations, as shown in FIGS. 1 to 3, there is a fixed structure 5 between the top of the sliding component 4 and the fixing component. The fixed structure 5 is used for disassembling and installing the fixing component. Specifically, the presence of the fixed structure 5 allows the fixing component to be disassembled and installed on the top of the sliding component 4. This enables convenient replacement of the fixing component based on different installation environments, making the installation of the lighting fixture more convenient and flexible.

In some embodiments, the above-mentioned fixed structure 5 can have a structure as shown in FIGS. 1 and 3. As shown in FIG. 2, the fixed structure 5 includes an installation piece 501 positioned on the side of the fixing component and a fastener 502 that passes through the installation piece 501. The top of the sliding component 4 also has a threaded hole, and the end of the fastener 502 is threadedly connected to the sidewall of the threaded hole. Specifically, when the fixing component needs to be secured, it is only necessary to pass the fastener 502 through the installation opening on the installation piece 501 and then install it in the threaded hole at the top of the sliding component 4 to achieve the tight fixing of the installation piece 501 on the fixing component.

As a preferred option, the fixing component is generally a UL aircraft wing or a DM spring. In this case, the installation piece 501 can be positioned on the side of the aircraft wing or the side of the spring mounting plate, ensuring a more secure fixation.

Furthermore, as shown in FIG. 7, building upon the sliding component 4 mentioned above, when the fixing component uses a combination of a spring and a pressure plate, it is only necessary to set two coaxial pillars at the top of the sliding component 4. This allows the spring and pressure plate to be installed by simply inserting the pillars into both ends of the spring, making the fixing of the fixing component more convenient.

Figure 4:
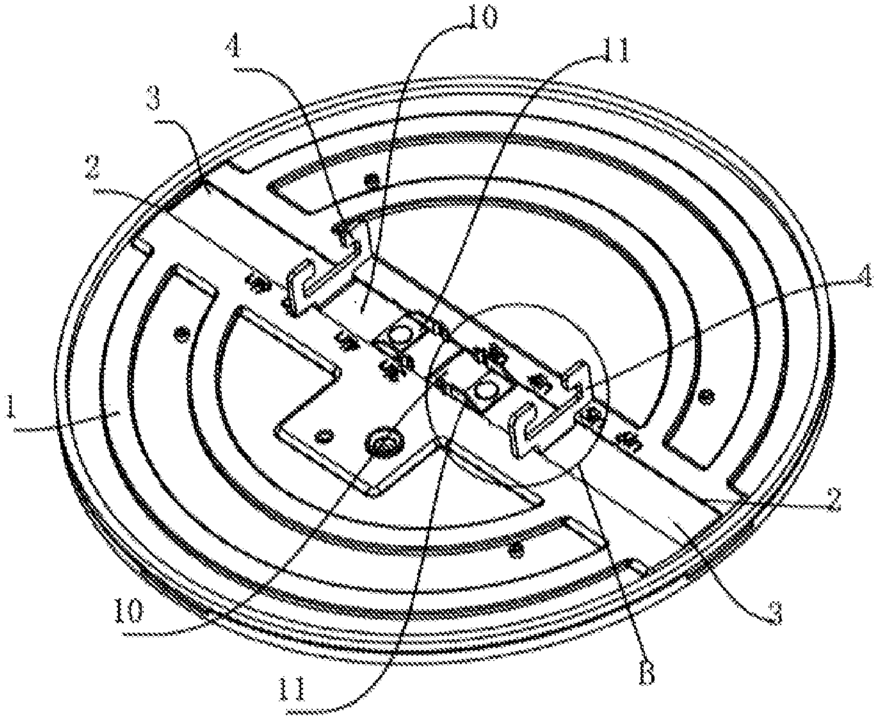
FIG. 4 illustrates another lighting apparatus example.
Figure 5:
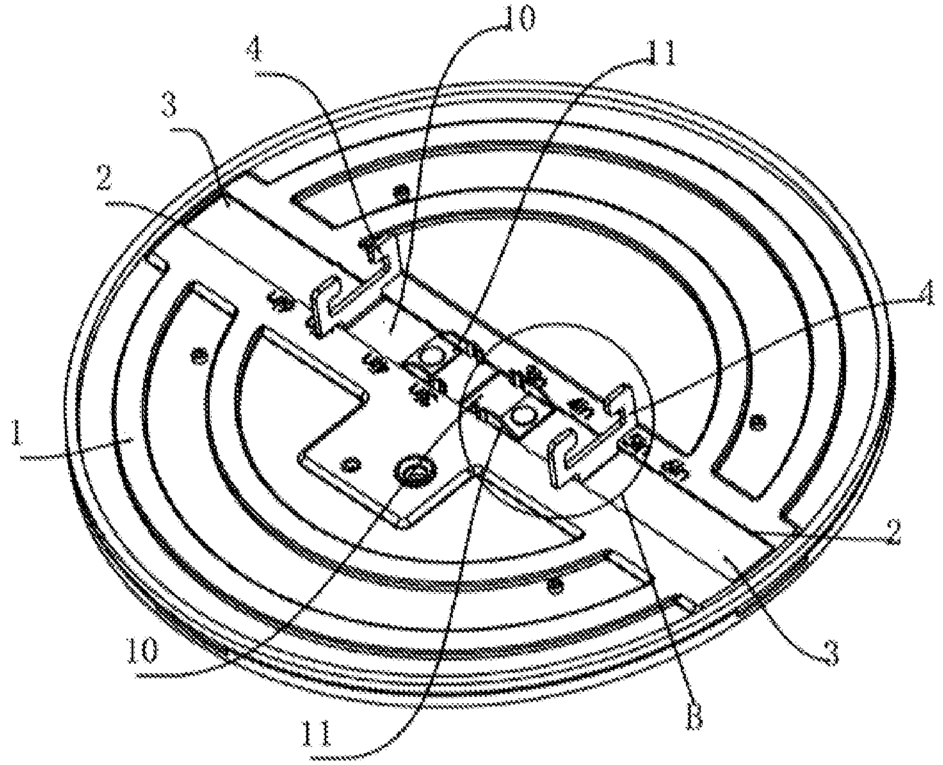
FIG. 5 illustrates a zoom-up view of an area in the example of FIG. 4.
Figure 6:
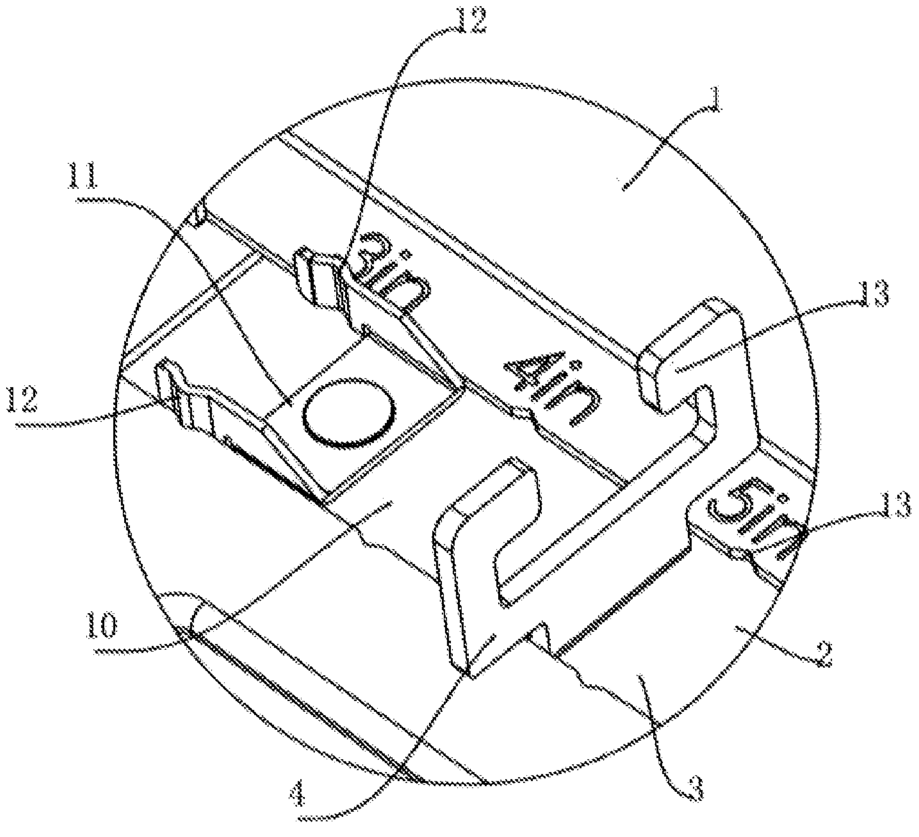
FIG. 6 illustrates a holder and a sliding unit example.

In some possible implementations, as shown in FIGS. 4 and 6, the side of the sliding piece 10 also has guide elements 11, and the guide elements 11 on both sides abut against the two side walls of the positioning groove 2. Specifically, the guide elements 11 are generally detachably fixed to the front of the sliding piece 10 and can be installed in the gap between the supporting base 3 and the side wall of the main housing 1 when the sliding piece 10 is installed. The guide elements 11 on both sides respectively abut against the two side walls of the positioning groove 2. Due to the limiting effect of the guide elements 11, the sliding piece 10 can slide along the length direction of the positioning groove 2 during the sliding process.

As a preferred option, the guide elements 11 are U-shaped and made of bent metal sheets. The bottom of the guide elements 11 is fixed to the sliding piece 10 through fasteners 502, and the sides of the guide elements 11 abut against the two side walls of the positioning groove 2.

Building upon the guide elements 11 mentioned above, as shown in FIGS. 5 and 6, there are elastic protrusions 12 on both sides of the guide elements 11, and there are also positioning slots 13 on both side walls of the positioning groove 2 that are adapted to the elastic protrusions 12. Multiple positioning slots 13 are spaced along the length direction of the positioning groove 2. Specifically, the positioning slots 13 are arranged in groups of two on both sides of the positioning groove 2, and the distance between two groups of positioning slots 13 can be determined based on common installation hole dimensions. This allows for convenient and precise adjustment of the position of the sliding component 4 by cooperating with the positioning slots 13 and elastic protrusions 12. This makes it more convenient to adjust the position of the sliding component 4 based on the size of the installation hole, facilitating the installation of the fixture.

In some possible implementations, as shown in FIGS. 1 and 4, the main housing 1 includes a translucent cover and a heat dissipation base that is covered by the translucent cover. The sliding groove is set on the heat dissipation base. This makes the assembly of the lighting fixture more convenient.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Althrough the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a light source;
a light housing with a back cover and container, wherein the container has a light opening, wherein the light source is placed in the container and emits a light through the light opening;
a sliding track disposed on the back cover;
a first sliding unit movable along the sliding track;
a first holder with a bottom end fixed to the first sliding unit;
a second sliding unit movable along the sliding track;
a second holder with a bottom end fixed to the second sliding unit;
a first fixing unit fixed to the first holder; and
a second fixing unit fixed to the second holder, wherein a relative width between the first holder and the second holder is adjustable by moving the first sliding unit and the second sliding unit for changing a spanning diameter of the first fixing unit and the second fixing unit to adapt to different installation platforms with different installation diameters.

2. The lighting apparatus of claim 1, wherein the sliding track has a top plate, a lateral wall and a bottom plate, wherein the top plate has a slit opening.

3. The lighting apparatus of claim 2, wherein the sliding unit has a top part, a middle part and a bottom part, wherein the top part is parallel to the bottom part, wherein the middle part connects the top part and the bottom part, wherein the top part is above the top plate of the sliding track, wherein the bottom part is blow the top plate.

4. The lighting apparatus of claim 2, wherein the bottom plate is a portion of the back cover.

5. The lighting apparatus of claim 1, wherein the sliding track is a separate component fixed to the back cover with a fastener.

6. The lighting apparatus of claim 1, wherein there are multiple alignment structures, wherein when the sliding unit is placed at one of the multiple alignment structure, unless an external force over a threshold is applied, the sliding unit stays at the alignment structure.

7. The lighting apparatus of claim 6, wherein the alignment structure is a groove, wherein the multiple alignment structures correspond to multiple installation platforms.

8. The lighting apparatus of claim 7, wherein the sliding unit has an elastic component for generating an elastic force for keeping the sliding unit staying at the groove unless an external force larger than the threshold to move the sliding unit.

9. The lighting apparatus of claim 1, wherein the first fixing unit and the second fixing unit are respectively fixed to the first holder and the second holder with a first connector and a second connector, wherein the first connector and the second connector are unlocked to replace to another type of the first fixing unit and the second fixing unit.

10. The lighting apparatus of claim 9, wherein the first fixing unit and the second unit comprise two torsion springs.

11. The lighting apparatus of claim 9, wherein the first fixing unit and the second unit comprise to foldable elastic plates.

12. The lighting apparatus of claim 1, wherein the back cover is circular plate, wherein there is a circular rib disposed on the circular plate.

13. The lighting apparatus of claim 12, wherein the sliding track has a protrusion structure together with the circular rib to enhance the structural length.

14. The lighting apparatus of claim 12, wherein the a height of the diameter is smaller than 20% of a diameter of the circular plate.

15. The lighting apparatus of claim 14, wherein the sliding track has a electrical power socket for guiding an electrical power to the light source.

16. The lighting apparatus of claim 14, wherein a power bracket for mounting a driver container to keep the driver container fixed at a same position, wherein the driver container comprises a driver circuit for generating a driving current to the light source.

17. The lighting apparatus of claim 1, wherein the sliding track is a separate component detachably attached to the back cover with a back connector.

18. The lighting apparatus of claim 1, wherein the first holder is rotatable on the sliding track to change a relative position to the second holder.

19. The lighting apparatus of claim 1, wherein the sliding track has a driver container, wherein the driver container contains a driver circuit for generating a driving current to the light source.

20. The lighting apparatus of claim 1, wherein the sliding track is attached to the back cover with a magnetic component.

* * * * *